April 22, 1958 J. P. JONES, JR 2,831,987

TRANSISTOR BINARY COMPARATOR

Filed Oct. 24, 1956

INVENTOR.
JOHN PAUL JONES, JR 2,831,987
Patented Apr. 22, 1958

2,831,987

TRANSISTOR BINARY COMPARATOR

John Paul Jones, Jr., Pottstown, Pa., assignor to Navigation Computer Corporation, a corporation of Pennsylvania Application October 24, 1956, Serial No. 618,079

4 Claims. (Cl. 307—88.5)

Figure 1:
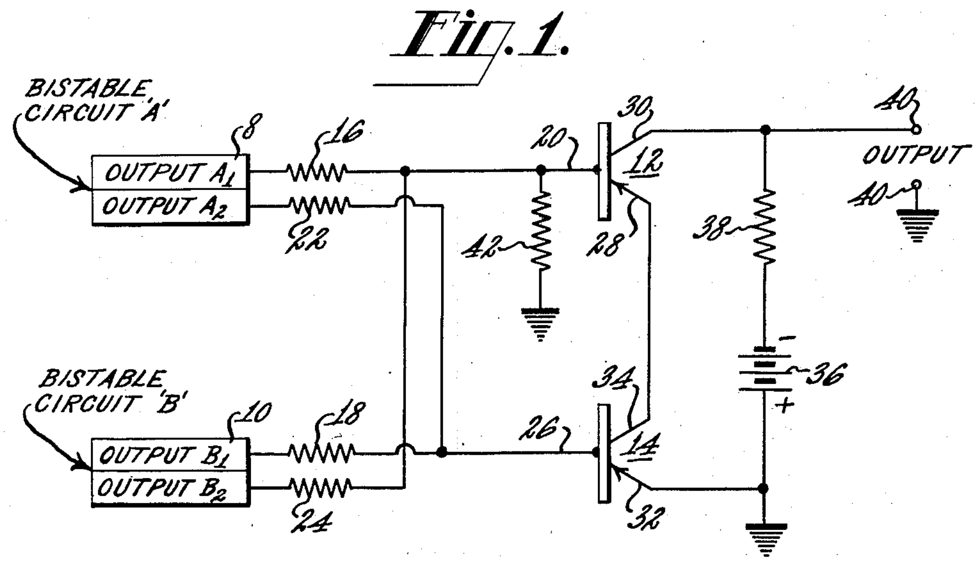

This invention relates in general to computer circuits and in particular to a transistor computer circuit capable of performing the material equivalence function.

One type of circuitry common in computer systems and the like is the so-called material equivalence circuit. This type circuit provides an output voltage or current in response to two similar inputs. In the binary code this means that if either one of two inputs is a "1" and the other of the two inputs is a "0," there will be no output. If both of the inputs are "1" or if both are "0," on the other hand, there will be an output. Generally, the circuits for performing this function are relatively expensive and may be quite complicated. Moreover, if gain is desired in addition to the logic function, a separate amplifier must be utilized.

It is, accordingly, an object of this invention to provide an improved and simplified material equivalence circuit.

It is another object of the present invention to provide an improved material equivalence circuit which utilizes transistors as active elements therein and which is simple in construction yet reliable in operation.

It is yet another object of the invention to utilize the characteristics peculiar to transistors to provide an extremely simple material equivalence circuit.

It is a further and important object of this invention to provide a simple and reliable material equivalence circuit which is readily adaptable to transistor driving elements.

These and further objects of the present invention are accomplished by exploiting the characteristics peculiar to transistors such that circuit simplicity and economy are achieved in a circuit which perform the material equivalence logic function with a high degree of reliability. A circuit embodying the invention comprises a pair of transistors, the collector-emitter paths of which are in series and in series with a supply source. By this type connection, as is well known and understood, an output is provided when, and only when, both transistors are rendered conductive. To provide the desired material equivalence logic function, a pair of bistable circuits having complementary outputs are cross-coupled, in accordance with the invention, through resistive direct-current conductive paths to the base electrodes of the respective transistors. The circuit operation is such that an output is provided only if both transistors are rendered conductive by the application of current to their respective base electrodes from the bistable circuits. This operation is provided only when the bistable circuits are in the same electrical state.

Figure 2:
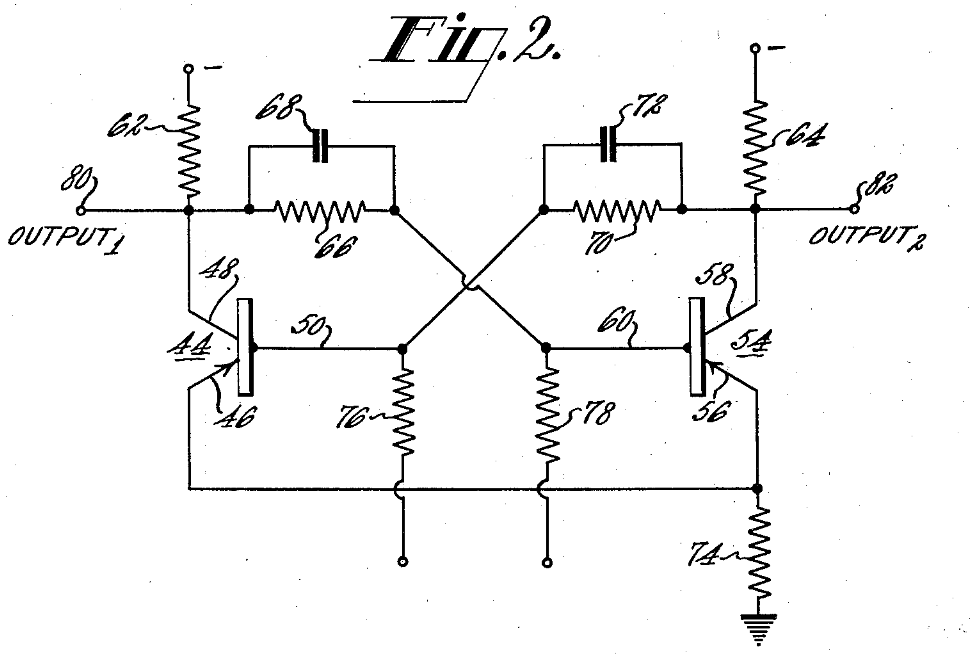

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram of a material equivalence circuit embodying the invention; and Figure 2 is a schematic circuit diagram of a transistor bistable circuit suitable for driving the transistor output circuit of Figure 1.

Referring now to the drawing and particularly to Figure 1 thereof, a material equivalence circuit embodying the invention includes a pair of bistable circuits 8 and 10 which will be referred to for convenience as bistable circuit "A" and bistable circuit "B," respectively. Each of the bistable circuits 8 and 10 will be assumed to have two stable and distinct electrical states. These states are one of low current conduction and a stable state of high current conduction. The state of low current conduction may be referred to, as it commonly is, as the "0" state while the high current conduction state may be referred to as the "1" state. In the circuit of Figure 1, each of the bistable circuits "A" and "B" has two outputs which are designated outputs $A_1$ and $A_2$ for the bistable circuit "A" and outputs $B_1$ and $B_2$ for the bistable circuit "B." The outputs $A_2$ and $B_2$ are complements of the outputs $A_1$ and $B_1$, respectively. That is to say, if the output $A_1$ is in the high current condition or "1" state then the output $A_2$ will be in the state of low current conduction "0" state, and vice versa. Similarly, if the output $B_1$ is in the high current condition or "1" state, then the output $B_2$ will be in a state of low current conduction or "0" state, and vice versa.

In accordance with the invention, the outputs $A_1$ and $B_2$ drive a first transistor 12 while the outputs $A_2$ and $B_1$ drive a second transistor 14. To this end, the outputs drive a second transistor 14. To this end, the outputs $A_1$ and $B_2$ are, according to the invention, direct-current conductively connected through substantially identical resistors 16 and 24, respectively, to the base electrode 20 of the transistor 12, while the outputs $A_2$ and $B_1$ are direct-current conductively connected through substantially identical resistors 22 and 18 to the base 26 of the transistor 14. The coupling resistors 16, 18, 22, and 24 preferably all have identical resistance values. The transistor 12, which may be considered to be of the P–N–P junction type, also includes an emitter 28 and a collector 30 and, similarly the other transistor 14, which is also of the P–N–P junction type, includes an emitter 32 and a collector 34 in addition to the base electrode 26. The transistors 12 and 14 are connected in series for direct-current with a direct-current supply source, which has been illustrated as a battery 36, the positive terminal of which is connected to a point of reference potential or circuit ground. The emitter 32 of the transistor 14 is also connected to ground while the collector 34 of the transistor 14 is directly connected to the emitter 28 of the other transistor 12. To complete the series direct-current circuit, the collector 30 of the transistor 12 is connected through a load resistor 38 to the negative terminal of the biasing battery 36. Thus the collector-emitter circuits of the transistors 12 and 14 are connected in series with each other and with the supply battery 36. The circuit is completed by a pair of output terminals 40, one of which is grounded and the other of which is connected directly to the collector 30 of the transistor 12.

By arranging the transistors 12 and 14 in series with the supply, an output change is provided across the load resistor 38 if, and only if, both transistors 12 and 14 are conductive. If one of the transistors 12 and 14 is non-conductive, or both are, then there will be no output voltage developed across the output load resistor 38.

The logic table for the material equivalence function is as follows:

| Condition | Input *a* | Input *b* | Output |
|---|---|---|---|
| W | 1 | 1 | Yes. |
| X | 0 | 0 | Yes. |
| Y | 0 | 1 | No. |
| Z | 1 | 0 | No. |

This table states that if the two inputs the inputs (*a*) and (*b*) in the table are both in the "1" state or both are in the "0" state there will be an output. This corresponds to conditions W and X in the table. If, on the other hand, one input is in the "0" state while the other is in the "1" state (conditions Y and Z of the table), then there will not be an output. By the present invention this type logic, that of the material equivalence function, is performed simply and reliably with a minimum number of circuit components.

In discussing the operation of the circuit illustrated in Figure 1, the above table will be referred to. The input (*a*) of the table refers to the bistable circuit "A." If the input (*a*) is in the "1" state it will be assumed that the output $A_1$ will be in the conducting or "1" state while the output $A_2$, since it is output $A_1$'s complement, will be in the "0" state. Similarly, if input (*a*) is in the "0" state the output $A_1$ will be in the "0" state and the output $A_2$ will be in the "1" state. The input (*b*) refers to the bistable circuit "B" and if the input (*b*) is the "1" or "0" state the output $B_1$ will be in a similar state while the output $B_2$ will be in the complementary state.

Consider first the condition or case when the input (*a*) of the table is in the "1" state and the input (*b*) is also in the "1" state (condition W). In this condition the output $A_1$ of Figure 1 will be in the highly conductive or "1" state, as will the output $B_1$, while the output $A_2$ and $B_2$ will be in the non-conductive or "0" state. It will be assumed that the "1" state corresponds to some negative voltage, −20 volts, for example. The "0" state, however, represents zero voltage or ground potential. With output $A_1$ in the "1" state, current will flow to the base 20 of the transistor 12 through the resistor 16. Similarly, current will flow from output $B_1$ to the base 26 of the transistor 14. Both transistors 12 and 14 are, therefore, conductive and there will be amplified current flow through the load resistor 38.

Consider next condition X of the table. In this condition output $A_1$ and $B_1$ will both be in the "0" state, while output $A_2$ and $B_2$ will be in the "1" state. Accordingly, current will flow through the resistors 22 and 24 to the base electrodes 26 and 20 of the transistors 14 and 12, respectively. Thus, both transistors are conductive and there will be amplified current flow through the load resistor 38.

In the Y condition, output $A_1$ and $B_2$ are in the "0" state, while outputs $A_2$ and $B_1$ are in the "1" state. Thus current will flow into the base 26 of the transistor 14 only, and since the transistor 12 is non-conductive there will be no output current flow through the load resistor 38. Similarly for condition Z of the table, output $A_1$ and $B_2$ will be in the "1" state, while outputs $A_2$ and $B_1$ will be in the "0" state. Thus, current will flow into the base 20 of the transistor 12 but not into the base 26 of the transistor 14. Since the transistor 14 is non-conductive, there will be no output current flow through the load resistor 38.

The outputs $A_2$ and $B_1$ of Figure 1 are isolated from each other when either is in the "1" state by the low impedance input of the transistor 14. In the case of the outputs $A_1$ and $B_2$, however, some means must be provided to isolate one from the other when they are in the "1" state and the transistor 14 is non-conductive. This means may be conveniently provided by connecting a resistor 42 between the base 20 and ground of the transistor 12. Although the resistance of the resistor 42 is low enough to isolate the outputs $A_1$ and $B_2$, it is high enough compared to the input impedance of the transistor 12 to have a negligible effect on the input drive and thus the conduction of the transistor 12 when the transistor 14 is also conducting.

While it will be understood that the circuit specification may vary according to the design for any particular application, the following circuit specifications are included for the circuit of Figure 1 by way of example only. It should also be understood that these specifications are intended for use with P–N–P transistors, but that by reversing the polarities of the biasing voltages, these specifications would also be appropriate for use with P type transistors, namely N–P–N junction transistors.

| | |
|---|---|
| Resistors **16**, **18**, **22**, and **24** | 33,000 ohms each. |
| Resistor **42** | 2,000 ohms. |
| Battery **36** | −20 volts. |

It is to be noted that the extreme simplicity of the invention is made possible by the special characteristics of transistors; namely that of having a very low input impedance and operating on current rather than voltage. Circuit simplicity and economy are realized since the output transistors 12 and 14 may be driven by current from the bistable circuits, rather than by a voltage as in conventional logic circuits. In addition to performing the required logic, a circuit of the type embodying the invention also contributes current gain to the logic function, thus permitting the elimination of a separate amplifier.

While the transistor output circuit may be driven by any pair of suitable bistable circuits, it is preferably driven by a pair of bistable circuits, each of which is of the type illustrated in Figure 2. In fact, one of the advantages obtained by the present invention is that the input impedance level of the output stage is high enough that transistor bistable circuits may be used as drivers without the danger of overloading. In Figure 2, a bistable multivibrator circuit or flip-flop includes a pair of transistors 44 and 54, which may be considered to be junction transistors of the P–N–P type, although other types could be used, including N–P–N junction transistors. The transistors 44 and 54 include respective emitter electrodes 46 and 56, collector electrodes 48 and 58, and base electrodes 50 and 60. The collector electrodes 48 and 58 are coupled through direct-current conductive load impedance elements, illustrated as a pair of resistors 62 and 64, respectively, to the negative terminal of a suitable source of energizing potential, such as a negative 20 volt direct-current supply, for example. The base 50 of the transistor 14 is coupled to the collector 58 of the transistor 54 through the parallel combination of a coupling resistor 66 and capacitor 68. The base 60 of the transistor 54 is coupled to the collector 48 of the transistor 44 through the parallel combination of a coupling resistor 70 and capacitor 72, thereby providing regenerative action. The emitter electrodes 46 and 56 are connected to a point of reference potential or circuit ground through a resistor 74. Input trigger signals from any convenient source may be applied in parallel to the base electrodes 50 and 60 through a pair of isolating resistors 76 and 78, to set and reset the circuit, respectively. The circuit is completed by a pair of output terminals 80 and 82 which are connected to the collectors 48 and 58, respectively.

The circuit of Figure 2 operates, by virtue of the regenerative coupling, so that the circuit can remain in either one of two stable states. In the first stable state, for example, the transistor 44 will be conductive and the transistor 54 will be non-conductive. This corresponds to a "1" state and a "0" state, respectively. The base of transistor 44 is held at a voltage below ground by the high collector voltage of transistor 54, and thus a sizable baseto-emitter current flows in the transistor 44 and keeps it in a high conduction or "1" state. Meanwhile, the base of the transistor 54 is held above ground potential and the transistor 54 remains non-conductive or in the "0" state. The circuit switches from one stable state to the other by the application of a positive trigger pulse to the base of the conducting transistor or the application of a negative pulse to the base of the off transistor through the isolating resistors 76 and 78.

As described, it is evident that the output terminals 80 and 82 in Figure 2 may correspond to the outputs $A_1$ and $A_2$ of the bistable circuit "A" and another and similar bistable circuit having similar output terminals may correspond to the outputs $B_1$ and $B_2$ of the second bistable circuit "B" of Figure 1. By applying trigger pulses to the bistable circuit, it will switch from one stable state to the other, providing complementary outputs at $A_1$ and $A_2$ and at outputs $B_1$ and $B_2$, as required.

As described, the material equivalence logic function is performed simply and reliably with a circuit having a minimum number of circuit elements and relatively simple circuit connections. The special characteristics or properties of transistors are utilized, by provision of the invention, to provide the desired logic function with signal amplification. In addition, the circuits embodying the invention are easily adapted to be driven by transistor bistable circuits.

What is claimed is:

1. A material equivalence circuit comprising, in combination, a first transistor and a second transistor each including common and output electrodes connected in series for direct-current and each having an input electrode, said transistors being connected in said circuit to provide an output variation only when both of said transistors are conductive, means providing an output circuit connected with one of said transistors for deriving an output signal in response to a conductive condition of both of said transistors, first bistable means having a pair of output terminals providing complementary output voltages, means direct-current conductively connecting one of said output terminals with the input electrode of said first transistor and the other of said output terminals with the input electrode of said second transistor, second bistable means having a pair of output terminals providing complementary output voltages, and means direct-current conductively connecting one of said output terminals of said second bistable means with the input electrode of said first transistor and the other of said output terminals of said second bistable means with the input electrode of said second transistor whereby said first and second transistors are simultaneously conductive only when said first and second bistable means are simultaneously in identical stable electrical states.

2. A material equivalence circuit as defined in claim 1 wherein the output terminals of said first and second bistable means are direct-current conductively connected to the respective input electrodes of said first and second transistors through equal resistive impedance means.

3. A material equivalence circuit comprising, in combination, first bistable means having two distinct electrical states, means providing a first pair of output terminals for said first bistable means, the simultaneous output voltages at said first pair of output terminals being complements of each other, second bistable means having two distinct electrical states, means providing a second pair of output terminals for said second bistable means, the simultaneous output voltages at said second pair of output terminals being complements of each other, a first and a second transistor each having a common, an output, and an input electrode, means providing a direct current supply source, means including a direct-current conductive output circuit connecting the output and common electrodes of said first and second transistors in series with said supply source, means connecting one of said first pair of output terminals with the input electrode of said first transistor, means connecting the other of said first pair of output terminals with the input electrode of said second transistor, means connecting one of said second pair of output terminals with the input electrode of said first transistor, and means connecting the other of said second pair of output terminals with the input electrode of said second transistor, said transistors being rendered simultaneously conductive to provide an output variation across said output circuit only when said first and second bistable means are simultaneously in identical stable electrical states.

4. A material equivalence circuit as defined in claim 3 wherein each of said transistors includes emitter, base, and collector electrodes, and wherein said base electrodes are the input electrodes of each of said transistors and the collector and emitter electrodes of each of said transistors are connected in series with said output circuit and with said supply source.

References Cited in the file of this patent

UNITED STATES PATENTS

| | | |
|---|---|---|
| 2,615,127 | Edwards | Oct. 21, 1952 |
| 2,641,696 | Woolard | June 9, 1953 |

OTHER REFERENCES

Electronics, June 1955, pp. 132–6, "Directly Coupled Transistor Circuits," by Beter et al.